United States Patent
Blasi et al.

(10) Patent No.: US 10,791,033 B2
(45) Date of Patent: Sep. 29, 2020

(54) CLOUD-NATIVE NETWORK FUNCTION ASSESSMENT TOOL

(71) Applicant: Accenture Global Solutions Limited, Dublin (IE)

(72) Inventors: Luca Blasi, Rome (IT); Emanuele Trevisi, Rome (IT); Simone Catenacci, Rome (IT); Alessandro Orsano, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 325 days.

(21) Appl. No.: 15/819,580

(22) Filed: Nov. 21, 2017

(65) Prior Publication Data

US 2019/0158361 A1  May 23, 2019

(51) Int. Cl.
 H04L 12/24 (2006.01)
 H04L 29/08 (2006.01)
 H04L 12/26 (2006.01)

(52) U.S. Cl.
 CPC ......... H04L 41/14 (2013.01); H04L 41/0853 (2013.01); H04L 41/22 (2013.01); H04L 43/065 (2013.01); H04L 43/14 (2013.01); H04L 67/10 (2013.01); H04L 67/36 (2013.01)

(58) Field of Classification Search
 CPC ....... H04L 41/14; H04L 43/065; H04L 67/36; H04L 41/0853; H04L 43/14; H04L 67/10; H04L 41/22
 See application file for complete search history.

(56) References Cited

U.S. PATENT DOCUMENTS

| | | | | |
|---|---|---|---|---|
| 6,088,801 A | * | 7/2000 | Grecsek | G06F 21/51 726/1 |
| 2008/0101252 A1 | * | 5/2008 | Bui | H04L 63/105 370/252 |
| 2018/0285383 A1 | * | 10/2018 | Nara | G06F 16/178 |
| 2019/0258509 A1 | * | 8/2019 | Hackett | G06F 9/45558 |
| 2019/0271971 A1 | * | 9/2019 | Dunlop | G05B 19/41875 |

* cited by examiner

Primary Examiner — Lance Leonard Barry
(74) Attorney, Agent, or Firm — Brinks Gilson & Lione

(57) ABSTRACT

A system for improving network capabilities is provided for enabling diagnostics and deployment of hybrid cloud technology. The system may obtain a plurality of display prompts. The display prompts may be associated with a stack of respective software criteria indicative of software capabilities and network functions. The system generates a prompt interface including a plurality of display prompts. The system may include an analytics engine to analyze the inputs responsive to the stack interface. The output of the analytics engine may include a capability score representing a measurement of satisfaction of a software criterion by a network node. The system may identify, based on a capability metric, a recommendation text associated with the software criterion. The system may generate a report interface comprising the recommendation text. The recommendation text may include a suggested modification to the network node including hybrid cloud architecture transformation and virtualization management deployment.

24 Claims, 10 Drawing Sheets

Liquid Evaluation Matrix

Final Evaluation

| Criteria | Weight | Unweighted Score Application | Weighted Score Application |
|---|---|---|---|
| 1. Modular Architecture | 30 | 1.9 | 14.5 |
| 2. Next Generation Integration | 25 | 2.1 | 13.3 |
| 3. Cloud Readiness | 25 | 2.4 | 15.2 |
| 4. Continuous Delivery | 20 | 1.3 | 6.7 |
| TOTAL (out of 100) | 100% | | 50% |

114 → criteria; 602 → weight; 306 → unweighted; 604 → weighted; 308 → total

Scoring Criteria

| Score | Description |
|---|---|
| 4 | Available or easily achieved |
| 3 | Can be done with reasonable effort |
| 2 | Can be done with reasonable effort but with limitations |
| 1 | Cannot be done or done with huge effort |

FIG. 6

CLOUD-NATIVE NETWORK FUNCTION ASSESSMENT TOOL

TECHNICAL FIELD

This disclosure relates to network computing and, in particular, to improvement networking assets based on computing design principals.

BACKGROUND

Many legacy computer and network systems may operate on outdated or inefficient design principals. For example, legacy computer and network systems may include software tightly coupled with specific purpose-built hardware. The tight coupling presents challenges to migrating legacy computer and network systems to modern architectures, such as cloud-based architectures. Current methods of assessing the software and network capabilities of a legacy system suffer from a variety of drawbacks, limitations, and disadvantages that can hamper deployment of hybrid cloud services and virtualization applications. There is a need for the inventive systems and methods described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 6 illustrates an example of a display interface for a system.

DETAILED DESCRIPTION

Figure 1:
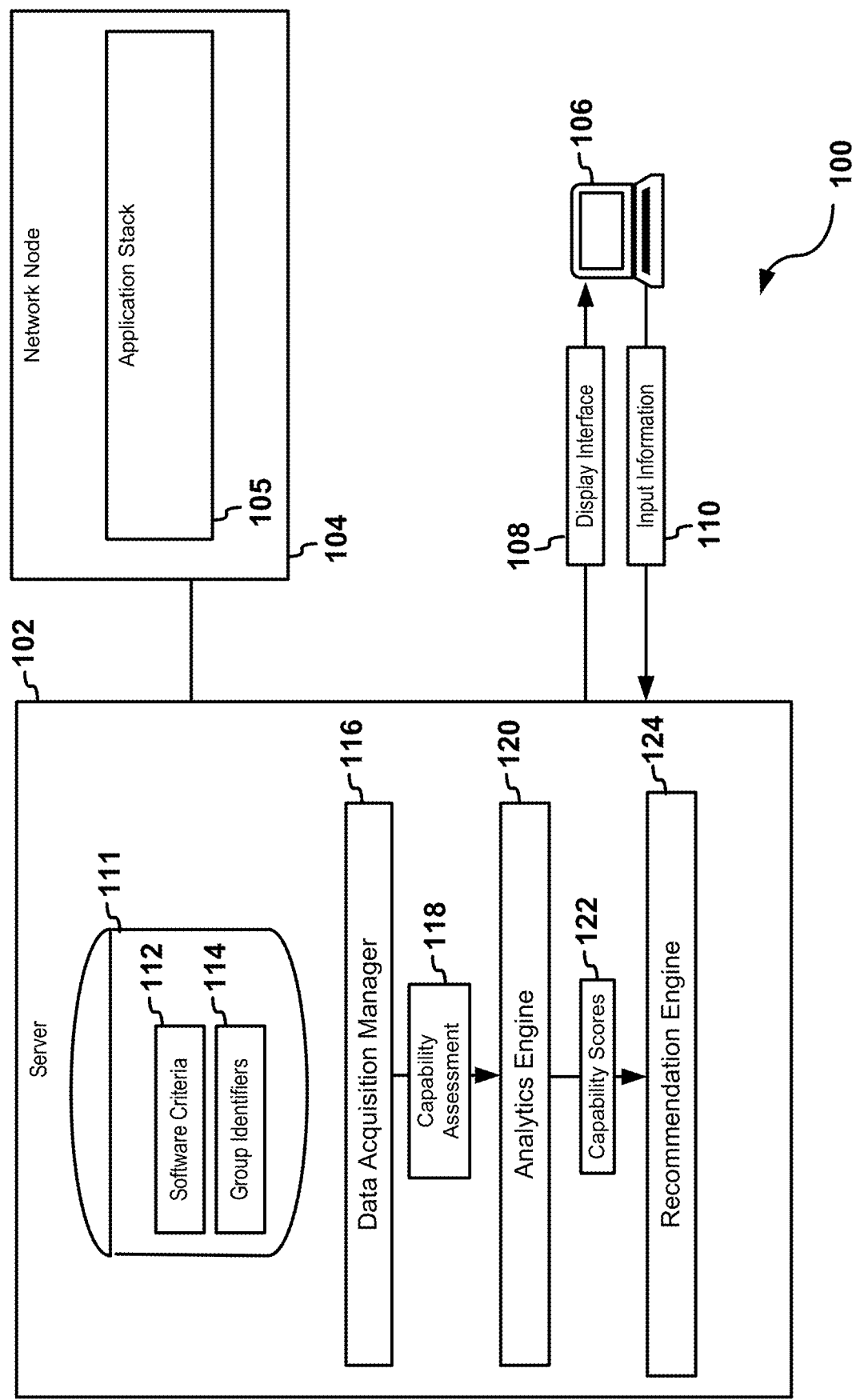
FIG. 1 illustrates an example of a system for enabling deployment of hybrid cloud technology and virtualization application stack analytics.

By way of an introductory example, the system may obtain a plurality of display prompts. The display prompts may be associated with a stack of respective software criteria stored in a repository. The respective software criteria indicative of a software architecture for an application stack included in a network node. The respective software criteria stacks may include a first group of software criteria representative of software modularity, a second group of software criteria representative of software interoperability, a third group of software criteria representative of software scalability, and/or a fourth group of criteria representative of software maintainability.

The system may transmit a prompt interface comprising at least one of the display prompts. The system may include an analytics engine to generate a capability score based on input to the prompt interface. The input to the prompt interface may correspond to at least one of the display prompts. The capability score may be representative of a measurement of satisfaction of a software criterion by the network node;

The system may identify, based on the capability score, a plurality of recommendations associated with the software criteria. The recommendations may include a first recommendation descriptive of a first recommendation to improve software modularity on the network node, a second recommendation to improve software interoperability on the network node, a third recommendation to improve software scalability on the network node, and/or a fourth recommendation to improve software maintainability on the network node. The system may transmit a report interface including the recommendations.

In some examples, at least one of the display prompts may correspond to the first group of software criteria representative of software modularity. The at least one of the display prompts may be configured to receive the input to the prompt interface. The input to the display interface may include an assessment of the network node including at least one of: atomic decoupled components, stateless components that operate independent of other components, or microservices.

Alternatively or in addition, at least one of the display prompts may correspond to the second group of software criteria representative of software interoperability. The at least one of the display prompts may be configured to receive the input to the prompt interface. The input to the prompt interface may include an assessment of the network node including at least one of software having an application program interface (API) layer, software having a representational state transfer (REST) web services, or software having network function virtualization (NFV).

In other examples, at least one of the display prompts may be associated with the third criteria group based on software scalability. The at least one of the display prompts may be configured to receive the input to the prompt interface. The input to the prompt interface may include an assessment of the network node including at least one of services that are fault-tolerant, services that expose health metrics, or services that communicate over a secure protocol.

Alternatively or in addition, at least one of the display prompts may be associated with the fourth criteria group corresponding to software maintainability. The at least one of the display prompts configured to request an assessment of the network node including at least one of software developed based on agile development, software managed by development operation platforms, or software compiled and tested using executable scripts.

In some examples, to obtain the capability score, the system may receive, from a terminal device configured to display the prompt interface, a capability weight value and a capability measurement value. The capability weight value and the capability measurement value may correspond to at least one of the respective software criteria. The system may generate the capability score based on the capability weight value and the capability measurement value. The system may associate the capability score with the at least one of the respective software criteria.

Alternatively or in addition, the system may send a probe message to the network node using a software protocol implemented on the network node. The system may receive, from the network node, a response message. The system may evaluate the response message to determine a presence of a software capability on the network node. The system may include, in response to determination of the presence of the software capability, the at least one of the display prompts in the prompt interface.

In some examples, to obtain the capability score, the system may calculate, based on predetermined scoring logic and the responses, respective capability scores for the software criteria. The system may generate, based the respective capability scores, respective group scores for each of the one or more criteria groups. The system may weigh the respective group scores with respective predetermined weights associated with the criteria groups. The system may generate an index score based on a weighted combination the group scores.

In some examples, to identify the recommendations, the system may compare the capability score to a predetermined threshold value. The system may select a recommendation in response to comparison of the capability score with the predetermined threshold value.

In some examples, the system may communicate the prompt interface to a terminal device. The system may receive, from the terminal device, the input including capability assessment information. The system may access scoring logic associated with the software criterion, the scoring logic configured to calculate the capability score. In some examples, to obtain the capability score, the system may calculate the capability score based on the scoring logic and the capability assessment information.

In some examples, to transmit the report interface, the system may sort the recommendations based on a plurality of respective capability scores, the respective capability scores associated with the recommendations in the repository. The system may include the sorted recommendations in the report interface.

In some examples, the system may generate a notification message comprising a link configured to load the report interface. The system may determine generation of the report interface is completed. The system may communicate, in response to generation of the report interface being completed, the notification message to a terminal device.

In some examples, the system may determine, based on fulfillment logic and the capability score, whether one or more of the respective software criteria is satisfied. The system may include, on the report interface, a display indicator corresponding to one or more software criteria, the display indicator indicative of satisfaction of the one or more respective software criteria.

Alternatively or in addition, the system may communicate a probe message to the network node according to a communication protocol configured on the network node. The system may receive a response from the network node. The system may determine, based on the response that the network node satisfies a software criterion included in the respective software criteria. The system may filter, from the display prompts, a display prompt associated with the software criterion.

One example of a technical effect achieved by the systems and methods described below may be that display prompts may improve the human-machine interaction by removing human error from the assessment of the capabilities of the network node. Human error may result in targeting the wrong aspects of a legacy system or implementing needless upgrades while other aspects of the legacy system further delay or obfuscate migration to a targeted architecture. The display prompts may include user-friend questions that may be presented in an orderly fashion allowing a user to focus on specific aspects of the network node and provide input in a manner that is intuitive to the user.

Alternatively or in addition, another example of a technical effect achieved by the systems and method described below is that capabilities of the network node may be strategically identified and targeted for improvement to achieve desired design principles. The system and methods described below may allow certain aspects of the design principles to be weighted above other aspects. The software capabilities of the network node may be targeted based on the weighted aspects of the design principles. Accordingly, the legacy system can be targeted for improvement in the areas most important for a desired asset.

Alternatively or in addition, another example of a technical effect achieved by the systems and method described below may be that the software criteria and/or the display prompts may be filtered based in interaction with the network node. The network node may be probed for the existence or non-existence of certain capabilities corresponding to the software criteria. Alternatively or in addition, the software capabilities on the network node may be assessed based on the results of the probing. The amount of processing power needed to generate the display interfaces may be reduced for software criteria that may be assessed based on the probing.

Additional benefits, efficiencies, and improvements over existing market solutions are made evident in the systems and methods described below. Hence, the systems and methods described herein offer improvements over existing market solutions.

FIG. 1 illustrates an example of a system 100 for enabling deployment of hybrid cloud technology and virtualization application stack analytics. The system 100 may include a server 102, a network node 104, and a terminal device 106. The server 102 may, among other features described herein, determine and/or recommend the aspects of the software on the network node 104 that should be targeted for improvement to achieve a targeted architecture. The targeted architecture may include a software architecture that follows predetermined design principles. In some examples, the targeted architecture may include design principles may maximize the benefits of cloud computing. Alternative or in addition, the design principals may promote distributed computing, decoupling of hardware and software, and maximization of cohesion between software applications.

In some examples, the target architecture may include a hybrid cloud architecture. The hybrid cloud architecture may include design principles including modularity, interoperability, scalability, and manageability. Table 1 provides an example of design principles for modularity, interoperability, scalability, and manageability.

TABLE 1

| Design principles |
| --- |
| Modularity |
| Modularization |
| Applications as a set of loosely coupled & State-Less micro services easy to update and scale<br>Abstraction |
| Isolation of technical complexity into platforms separate from business functionality, with both new and existing applications appearing less complex<br>Lightweight architecture |
| Evaluates the ability to swap components in and out as technology evolves, leveraging on an ecosystem of components |

TABLE 1-continued

| Design principles |
|---|
| Interoperability |
| Client API Layer |
| Reusable components accessed within a company as well as by external customers and business partners |
| Orchestration |
| Applications should be configured and continuously by a central engine tuned to meet the Business needs |
| iPAAS |
| Systems work together across public/private cloud platforms, SaaS applications, mobile back-end services, on-premise data centers |
| Scalability |
| Operate & Scale in the Cloud |
| Leverage on specific cloud advantages: Dynamic Capacity Management by Scale In/out while managing Application state |
| Metrics Monitoring |
| Integration with Std monitoring and Alerting Closed-Loop Systems, Measures collection and full visibility enablement of System performances |
| Security |
| Provide secure and reliable interfaces for both, control and data plane |
| Manageability |
| Agile |
| Adaptive planning, evolutionary development, early delivery, continuous improvement, and encourages rapid and flexible response to change |
| DevOps |
| Use automation techniques to optimize collaboration across development and operations |

The network node 104 may include a computing system. The computing system may include a combination of hardware and software. In some examples, the computing system and/or the software for the computing system may have been developed under legacy design principles. For example, the hardware included in the computing system may be designed for a specific solution. The software running on the hardware may be tightly coupled with the hardware. Accordingly, there may be a need to target certain aspects of the network node 104 for improvements to achieve the targeted architecture.

In some examples, the network node 104 may include the application stack 105. The application stack 105 may include the software stored and/or executed on the network node 104. The application stack 105 may include a plurality of application, services, operating systems, and other executable instructions included on and/or executed on the network node. In some examples, the application stack 105 may be tightly coupled to the underlying hardware of the network node. Alternatively or in addition, the application stack 105 may lack modularity, scalability, interoperability, or manageability. Accordingly, the application stack 105 may be targeted for improvements. The software capabilities of the application stack 105 may be assessed according to the design principles described herein.

A software capability may refer to feature, configuration of software, and/or programmed logic that may be implemented on a computing system. The software capability may be improved by reprogramming or replacing logic stored in the network node 104. The server 102 may identify the one or more software capabilities of the network node 104 that should be targeted for improvement.

The server 102 may communicate with the network node 104, the terminal device 106, or other electronic devices to perform analysis of the network node 104. The server 102 may generate and/or communicate a display interface 108. The display interface 108 may include information configured for display one the terminal device 106, and/or any other electronic display. The display interface 108 may include text, images, icons, or any other form of display information. Alternatively or in addition, the display interface 108 may include buttons, fields, or other triggerable labels that are configured to receive input from a user. In some examples, the display interface 108 may include instructions, for example, HTML, XML, JAVASCRIPT, commands, or any other type of instruction that the terminal device 106 may use to display the content included in the display interface. One of ordinary skill in the art will appreciated that the content of the display interface 108 may change as the server 102 processes information and as users interact with the display interface 108 via the terminal device 106. The display interface 108 may comprise a series of messages, information, or other information exchanged between the server 102 and the terminal device 106.

In some examples, the display interface 108 include a graphical user interface used to gather information related to the network node 104. Alternatively or in addition, the graphical user interface may display the recommendation, analysis results, or other information generated by the server 102. When a user interacts with the display interface 108, the terminal device 106 may generate input information 110. The input information 110 may include interactions with the display interface displayed on the terminal device 106. The interactions may include any type input with respect to interactions with graphical user interfaces including, for example, clicks, touches, swipes, text, and/or any other information that may receive in response to interaction with the display interface 108.

The terminal device 106 may include an electric device configured to display information. The terminal device 106 may receive information from the server 102 over a network. Alternatively or in addition, the terminal device 106 may include hardware integrated with the server 102. The terminal device 106 may receive a display interface from the server 102.

The server 102 may include a repository 111. The repository 111 may include a database and/or a collection of data structures. The repository 111 may store software criteria 112. The software criteria 112 may represent criteria for software capabilities present in a targeted architecture. A targeted architecture may include a set of design principles that are desired for the network node 104. The software criteria 112 may include a rule that defines how software should operate to satisfy a design principle of the targeted software architecture. Tables 2-5 illustrate examples of various the software criteria 112. Table 2 represents a stack of the software criteria 112 for modular design principles. Table 3 includes examples of the stack of software criteria 112 for interoperable design principles. Table 4 includes examples of the stack of software criteria 112 for scalability principles. Table 5 includes examples of the stack of software criteria 112 for manageability principles.

TABLE 2

Software criteria for modular design principles.

Modularization

M1—Software includes atomic decoupled components.
M2—Software includes services that are stateless, independent and deployable independently from others.
M3—Software logs are centralized in a single point using a syslog server
M4—Software components must explicit dependencies and relationship with other services or libraries.
M5—Software connects its components and distribute load between many scale-out workers.
M6—Software design should follows micro-service design pattern and/or the software includes micro-services.

Abstraction

A1—Software does not take in care infrastructure aspects, like hypervisor, mount of File System, switch of IP Addresses.
A2—Software business logic is capable of evolving independently from infrastructure.
A3—Infrastructure can evolve independently from software.

Lightweight architecture

L1—Treat services as resources: application does not make a distinction between local and third party services. To the app, both are resources, accessed via a URL or other locator/credentials stored in its configuration. For example, the software is able to swap out a local MySQL database with one managed by NFVi without any changes to the app's code or to substitute a service with another one with the same interfaces and functionalities.

TABLE 3

Software criteria for interoperable design principles

Client/API Layer

C1—Software's components are accessible through API layer in order to maximized their reuse.
C2—Software's API layer manages the AAA of clients as well as the SLA and policy associate to specific API and/or client profile.
C3—Software's API is be exposed using HTTP Rest protocol.

Orchestration

O1—Software is managed by a NFVO for the LCM operations (instantiate, terminate, start, stop, configuration change, upgrade, scale in, scale out, healing). It means Application must be compliant to ETSI standards (provide sw-package ,sw-descriptor, expose interface to change configuration, etc . . . ).

iPaas iP1—Software is able to integrate service provided by cloud infrastructure or PaaS or SaaS as well as it is able to integrate "local" micro-services.

TABLE 4

Software criteria for scalable design principles

Operate & Scale in the cloud

OS1—Software service are able to be deployed into a light container (VM with max 4 vCore and 8 GB RAM).
OS2—Software service are able to scale horizontally in automatic way: if number of requests for a specific server role increases, the event must be detected in order to add one or more additional instances of that server role able to handled new requests.
OS3—Software service are fault-tolerant. For example, if an instance goes down, requests must be handled by other instances; if a process goes in stuck, the event must be detected in order to isolate/restart the process or the VM has to be relocated.
OS4—Software is geo redundant. For example, if a site goes in fault, incoming requests are redirected and handled by the software instance of other sites.

TABLE 4-continued

Software criteria for scalable design principles

OS5—Software can be stoppable by graceful shutdown without impact on overall service.
OS6—Software service is not be shared infrastructure resources including, for example, IP Address, File System, HA-cluster.
OS7—Application must be resilient to HW fault events: that events are managed by NFVi by VM-relocate operation. This operation cause temporary unavailability of resource (like network connection) that must be handled by application in order to avoid to lose transaction (like banking transaction or other critical transactions).
OS8—Database is able to scale as well as other services.

Metrics Monitoring

MM1—Software exposes health metrics. For example, health metrics can be retrieved by Infrastructure tool in "pull mode" or sent by Application in "push mode". Metrics are used to keep application under control and to lunch specific recovery actions (such as VM-relocate or scale-out).

Security

S1—Inbound and outbound data flow must use SSL protocol (or other secure protocols).
S2—Software stack can be installed and configured following the "Hardening Guidelines" and compliant to MIMIP requirements.
S3—Username, password and all credential are be stored in secure way, including, for example, encrypted into DB or any other container.

TABLE 5

Software criteria for management design principles

Agile

Ag—Agile adoption and consequent application by generation is organization-dependent and agile paradigm dependent (Kanban, Scrum, . . . )

DevOps

DO1—Software is managed by DevOps platforms and processes in order to be: compiled, packaged and versioned; installed in target environments; verified by functional and performance tests.
DO2—Scripts and development software is used for: compiling, testing, installation, and other phases of development, text, and deployment.

The repository 111 may include associations between the software criteria 112 and other information in the repository 111. For example, the software criteria 112 may include or be associated with an identifier, such as a primary key that is mapped to other information. In some examples, the software criteria 112 may be mapped to a group identifier 114.

The group identifier 114 may include, or be associated with the software criteria 112. One or more group identifiers may group the software criteria 112 into distinct groups of similar criteria. For example, the repository 111 may include a mapping between the group identifier 114 and the software criteria 112. Alternatively or in addition, the group identifier 114 may include or associate groups of similar software criteria. In some examples, the group identifier 114 may correspond to a design principle such as modularity, next generation integration, cloud readiness, continuous delivery, and/or any other design principle.

The server 102 may further include a data acquisition manager 116. The data acquisition manager 116 may acquire information related to the software criteria 112. The data acquisition manager 116 may receive input information 110 that represents satisfaction of the software criteria 112 by the network node 104. For example, the input information 110 may indicate whether software configured on the network node 104 include capabilities that satisfy the software criteria 112. In one example, the data acquisition manager 116 may receive answers to inquiries included in the software criteria 112. Alternatively or in addition, the data acquisition manager 116 may receive metrics representative of the use, presence and/or quality of implementation of software capabilities that satisfy the software criteria 112. Alternatively or in addition, the data acquisition manager 116 may communicate with the network node 104 to determine whether the network node 104 includes software that satisfies the software criteria 112. In some examples, the data acquisition manager 116 may communicate with other sources information that include information related to the network node 104. For example, the data acquisition manager 116 may communicate with vendor databases, electronic user manuals, software development libraries, or any other source of information to determine the software capabilities of the network node 104.

The data acquisition manager 116 may compile the information collected related to the network node 104 and generate a capability assessment 118. The capability assessment 118 may represent the software capabilities of the network node 104. The data acquisition manager 116 may collect information that describes the software capabilities of the network node 104 from the terminal device 106, the network node 104, and/or some other source of information. The data acquisition manager 116 may compile the acquired data into the capability assessment 118. In some examples, the data acquisition manager 116 may facilitate receiving or determining the capability assessment 118 for one or more software criteria 112 and/or group identifier 114. The data acquisition manager 116 may store the capability assessment 118 in the repository 111. The data acquisition manager 116 may associate one or more of the software criterion and/or the group identifier 114 with respective capability assessments. The data acquisition manager 116 is further discussed in reference to FIG. 2.

The server 102 may include a analytics engine 120. The analytics engine 120 may generate capability scores 122. The capability scores 122 may include one or more calculated score based on the capability assessment 118 and a scoring criteria. The capability scores 122 may include a measurement that the server satisfying one or more scoring criterion. Alternatively or in addition, the capability scores 122 may include a measurement of the server satisfying one or more groups of the software criteria 112. Alternatively or in addition, the capability scores 122 may include an aggregated score corresponding to server 102. The analytics engine 120 is further discussed in reference to FIG. 3.

The server 102 may include a recommendation engine 124. The recommendation engine 124 may prepare, generate, and or communicate recommendations for improvements to the server 102 and/or software included in the server 102. For example, the recommendation engine 124 may receive the capability scores 122. The recommendation engine 124 may evaluate the capability scores 122. Based on the evaluation of the capability scores 122, the recommendation engine 124 may generate one or more recommendations. The recommendations may include, for example, a suggested recommendation for satisfying one or more the software criteria 112. The recommendation engine 124 may organize the recommendations for display. The recommendation engine 124 may include the recommendations in the display interface 108. The recommendation engine 124 is further discussed in reference to FIG. 4.

Figure 2:
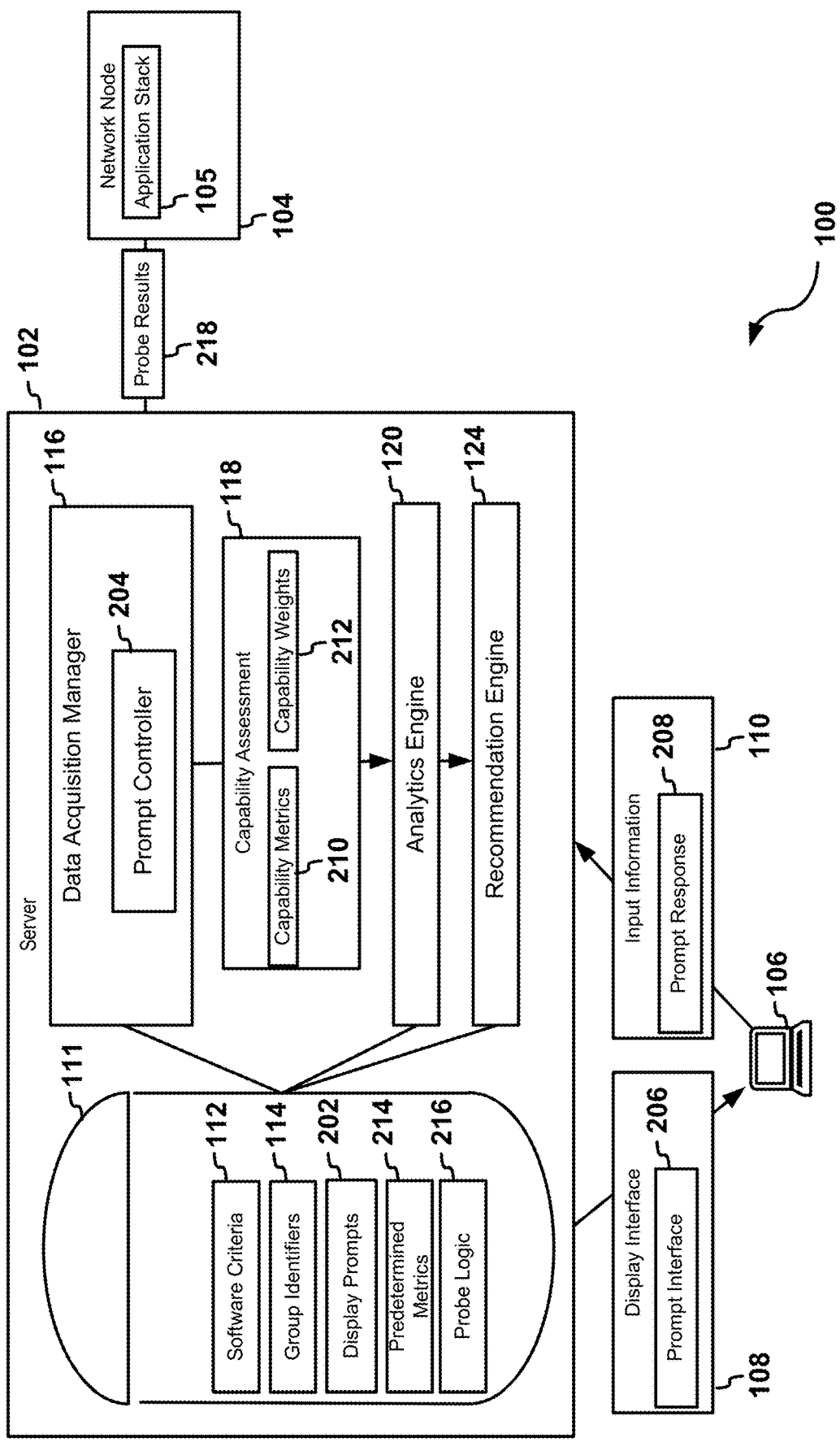
FIG. 2 illustrates an example of a data acquisition manager for a system.

FIG. 2 illustrates an example of the data acquisition manager 116 for the system 100. The data acquisition manager 116 may organize, select, and/or communicate display prompts 202 used to collect information related to the network node 104. The display prompts 202 may include predefine text, images, labels, or other information organized to request information from a user about the software capabilities of the network node 104. Alternatively or in addition, the display prompts 202 may include logic, such as HTML, JavaScript, XML, or any other type of logic used to display information. The display prompts 202 may include text corresponding to one or more software criteria 112. For example, a display prompt may include the text from one or more of the software criteria 112 exemplified in Table 2, Table 3, Table 4, and/or Table 5, as described in reference to FIG. 1.

The data acquisition manager 116 may include a prompt controller 204. The prompt controller 204 may generate a prompt interface 206. The prompt interface 206 may include one more of the display prompts 202. Alternatively or in addition, the prompt interface 206 may include one or more button, field, or other triggerable label receptive to user input. For example, the user may respond to one or more of the display prompts 202. The terminal device 106 may communicate the input information 110. The input information 110 may include a prompt response 208.

The prompt response 208 may include a response to information included in the prompt interface 206. In some examples, the prompt interface 206 may include logic configured to generate the prompt response 208. The prompt response 208 may include information related to the software capabilities of the network node 104. For example, the prompt response 208 may include, or be used by the server 102 to determine the capability assessment 118.

In some examples, the capability assessment 118 may include capability metrics 210 and capability weights 212. The capability metrics 210 may include an assessment of the satisfaction of one or more software criteria 112 by the network node 104. Alternatively or in addition, the capability metrics 210 may represent a measure of the presence, use, and/or implementation of one or more software capabilities that perform the software criteria 112. The capability metrics 210 may be human generated or machine generated. For example, the capability metrics 210 may be included in the prompt response 208 from the terminal device 106. In some examples, the capability metrics 210 may follow a scoring scale. The scoring scale may include a scoring range. For example, the scoring scale may include a scoring range from 1 to 4. A capability score of 1 may indicate that the capability cannot be accomplished without significant effort while a capability score of 4 may indicate that the capability can be easily achieved. It should be appreciated that the capability scale can include any other range of values.

Alternatively or in addition, the capability metrics 210 may be generated based on communication with the network node 104. For example, the data acquisition manager 116 may probe, test, or otherwise communicate with the network node 104 to determine the presence, use, and/or implementation of one or more software capabilities that correspond the software criteria 112. In some examples, the data acquisition manager 116 may communicate with the network node 104 using an application or communication protocol implemented on the network node 104. For example, the data acquisition manager 116 may utilize an API provided by the network node 104.

The capability weights 212 may include a measure of the value of achieving an aspect of the target architecture. For example, the capability weights 212 may measure the value of satisfying one or more the software criteria 112 on the network node 104. Alternatively or in addition, the capability weights 212 may measure the value of satisfying one or more design principals of the target architecture. The capability weights 212 may be human or machine generated. For example, the capability weights 212 may be received from the terminal device 106.

The capability metrics 210 and/or the capability weights 212 may, in some examples, be captured directly from a user interacting with the display interface 108. For example, the display interface 108 may include fields where the user may submit the capability metrics and/or a capability weights corresponding to one or more display prompt 202 included in the prompt interface 206. In some circumstances, however, it may be desirable to automatically generate the capability metrics 210 and capability weights 212.

The data acquisition controller may decouple the user experience from the scoring criteria. Accordingly, the display prompts 202 may be designed to promote increased reading comprehension and understanding by the user. In some examples, a user may submit responses to the display prompts 202 and the system may automatically generate the capability metrics 210 and or the capability weights 212. For example, the prompt controller 204 may access predetermined metrics 214. The predetermined metrics 214 may include metrics that are associated with one or more display prompts and/or prompts responses, or information included in the prompt responses. In response to receiving the prompt response 208, the prompt controller 204 may access the one or more of the predetermined metrics 214 from the repository 111. The predetermined metrics 214 may include, or be used to, calculate the capability metrics 210 and/or the capability weights 212.

In one example, a user may provide input for the display prompts 202. For example, the prompt interface 206 may display the following display prompt:

Are the application's components accessible through an API layer?

Figure 7:
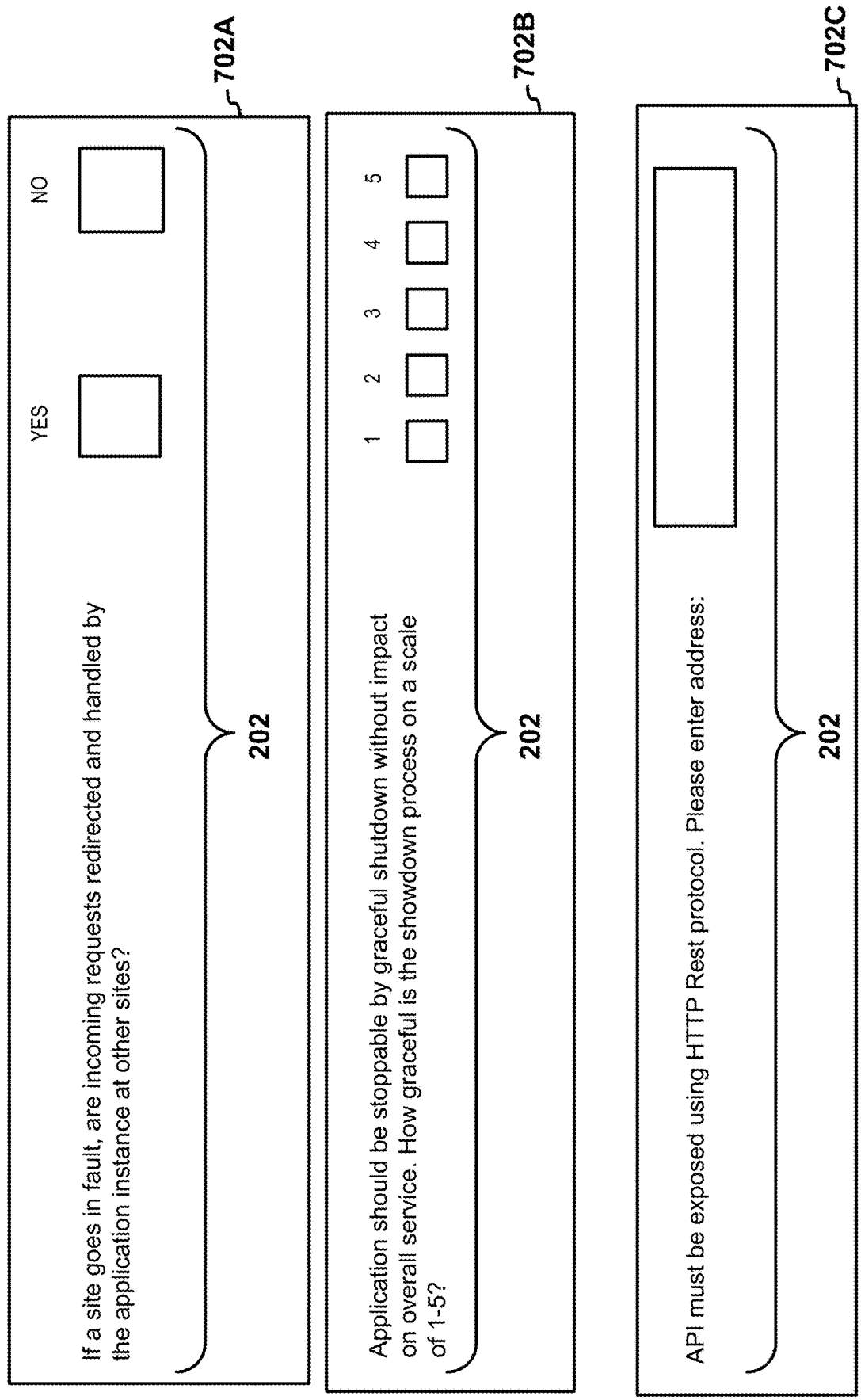
FIG. 7 illustrates an example of prompt interfaces for a system

The display prompt may be associated with the following software criterion:

C1—Application's components must be accessible through API layer in order to maximized their reuse A user may answer yes to the display prompt. The prompt response 208 may include the user's input, which is the answer YES. The display prompt and the prompt response may have been previously mapped to a predetermined metric. The predetermined metric may include, for example, a capability metric and/or a capability weight. The prompt controller 204 may generate the capability assessment 118. The capability assessment 118 may include the capability metric and/or the capability weight. Thus, in this example, the user was able to interact with a user-friendly display prompt and answer a question tailored to increase user comprehension and accuracy in assessing the capabilities of the network node. The prompt controller 204 interpreted the input from the display prompt and generated the capability metrics 210 and/or the capability weights 212 based on predetermined mappings associated with the user input. FIG. 7 illustrates additional examples of the prompt interface 206.

Alternatively or in addition, the prompt controller 204 may communicate with the network node 104 directly to generate the capability assessment 118. For example, the repository 111 may include probe logic 216 associated with one or more software criteria 112 and/or group identifiers 114. The probe logic 216 may include logic used to access the network node 104 and/or exercise functionality provided by the network node 104. For example, the probe logic 216 may be configured communicate with the network node 104 according to a protocol defined by the network node 104. The protocol may include, for example, an API, a data format, and/or communication rules that the network node 104 is responsive to.

The prompt controller 204 may receive probe results 218 from the network node 104. The probe results 218 results may include a response to a procedural call, API call, message, or other communication with the network node 104. The probe results 218 may be used by the data acquisition manager 116 to determine the presence of software capabilities and/or the quality of the implementation of the software capabilities. The data acquisition manager 116 may generate the capability assessment 118 based on the probe results 218. In some examples, the probe results 218, or information included in the probe results 218, may be previously mapped to the predetermined metrics 214. For example, the predetermined metrics may include the capability metrics 210 and/or the capability weights 212.

In some examples, the repository 111 may include a large number of software criteria 112, group identifiers, and/or the display prompts 202. It may be desirable, in some circumstances, to filter the display prompts 202 such that a user is not prompted to provide input related to software capabilities that do not exist in on the network node 104. The prompt controller 204 may utilize the probe results 218 to determine whether to include one or more of the display prompts 202. For example, the probe results 218 may indicate that a software capability is not present on the network node 104. The prompt controller 204 may filter, or exclude, the display prompt corresponding to the software criterion associated with the software capability.

Figure 3:
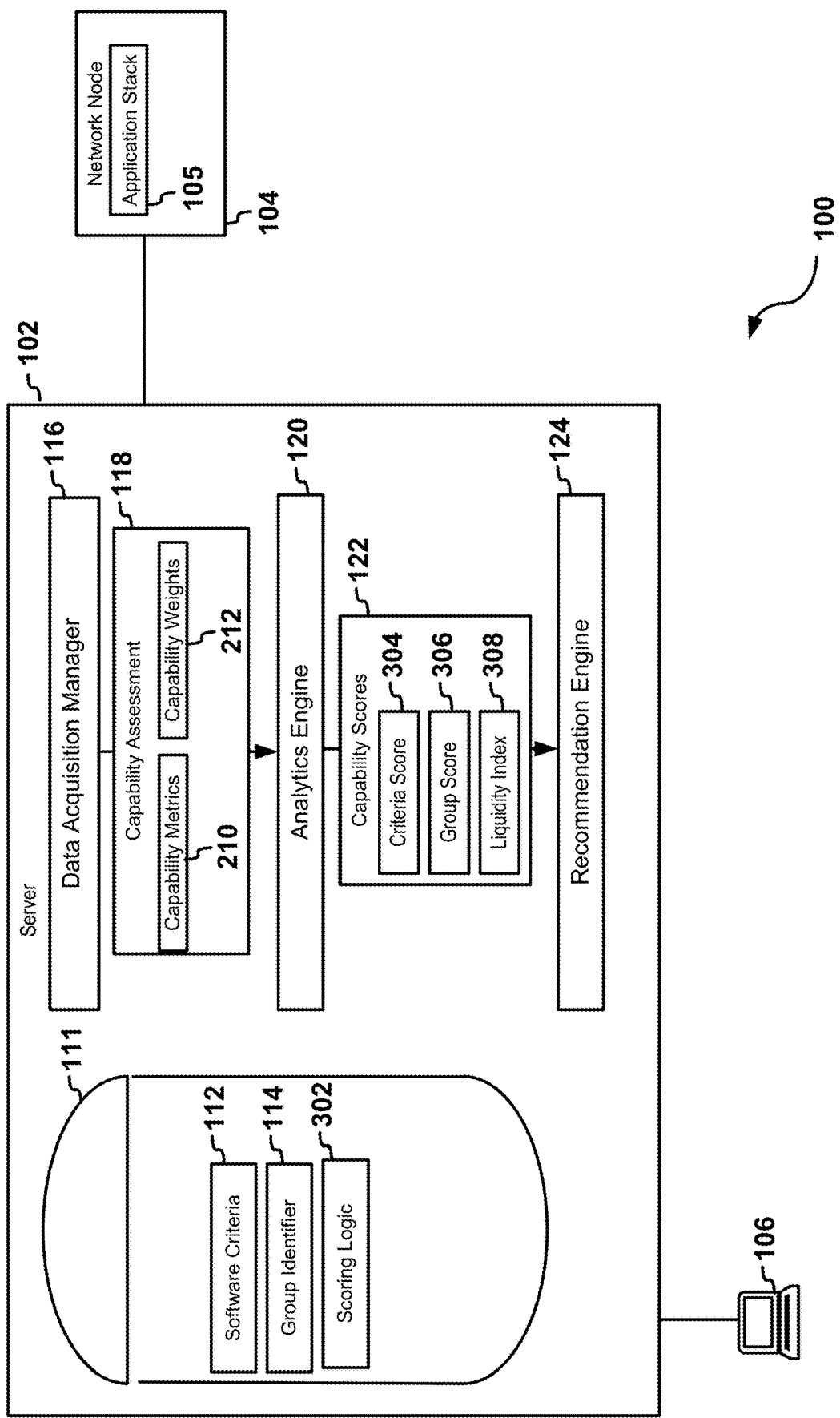
FIG. 3 illustrates an example of a analytics engine for a system.

FIG. 3 illustrates an example of the analytics engine 120 for the system 100. The analytics engine 120 may access or include scoring logic 302. The analytics engine 120 may utilize and/or execute the scoring logic 302 to calculate the capability scores 122. The repository 111 may include scoring logic 302. Alternatively or in addition, the analytics engine 120 may include the scoring logic 302. The scoring logic 302 may include logic instructions, criteria, mathematical rules, statistical rules, and/or algorithmic rules. Alternatively or in addition, the scoring logic 302 may include coefficients, constants, equations, and/or other mathematical values used to generate the capability scores 122.

In some examples, the capability scores 122 may include a criteria score 304, a group score 306, and/or a liquidity index score 308. The criteria score 304 may represent a measurement, base the scoring logic 302 and the capability assessment 118, that the network node 104 satisfies one or more of the software criteria 112. In one example, the scoring logic 302 may be configured to calculate the criteria score 304 as follows:

$$\text{criteria\_score}_i = (\text{capability\_metric}_i)(\text{capability\_weight}_i)$$

The $\text{criteria\_score}_i$ may refer to the criteria score corresponding to an $i^{th}$ software criterion of the software criteria 112. Thus $\text{criteria score}_i$ may include a weighted measurement of the presence, use, and/or implementation if a software capability that satisfies the $i^{th}$ software criterion. The $\text{capability\_metric}_i$ may refer to the capability metric determined for the $i^{th}$ software criterion. The $\text{capability\_weight}_i$ may refer to the capability weight determined for the $i^{th}$ software criterion.

The group score 306 may represent scores for one or more of the group identifiers 114. The group score 306 represent a measurement, based on the scoring logic 302 and the capability assessment 118, that the network node 104 satisfies one or more of the software criteria 112 associated with the group identifier 114. For example, the group score 306 may include a weighted combination of the capability metrics 210 and/or the criteria score 304. In one example, the scoring logic 302 may be configured to calculate the group score 306 as follows:

$$group\_score_j = \sum \frac{C_{ij}}{I}$$

The group_score$_j$ may refer to the group score 306 for the jth group identifier. C$_i$ may refer to the criteria score 304 for the i$^{th}$ software criteria associated with the j$^{th}$ group identifier. I may refer to the total number of the software criteria 112 associated with the j$^{th}$ group descriptor. Accordingly, the group score 306 for a group descriptor may include a weighted average of the capability metrics 210 for the software criteria 112 included or associated with the group identifier 114.

The liquidity index score 308 may include an aggregate combination of the the criteria scores 304 and the group scores 306. The liquidity index score 308 may include a measurement representing fulfillment of the target architecture by the network node 104. For example, the liquidity index score 308 may include a measurement of the overall maturity level of the specific Network Function under analysis compared to a defined reference carrier-grade standard for Telco cloud-native function. Alternatively or in addition, the liquidity index score 308 may include a calculated metric that represents the fulfillment of the software criteria 112 associated with the target architecture.

In some examples, the scoring logic may include group weights. Groups weights may refer to the importance placed on each of the groups corresponding to the group identifiers 114. The liquidly index score may be calculated based on the group weights and the group scores. For example, the liquidity index score 308 may be calculated as follows:

$$\text{Liquidty Index Score} = \frac{\sum (group\_score_j)(group\_weight_j)}{total\_group\_weight} * 100$$

The group_score$_j$ may refer the group score 306 calculated for the jth group identifier included in the group identifiers. The group_weight$_j$ may refer to the group weight assigned or associated with the jth group identifier. The total_group_weight may refer to the sum of all group weights assigned to the group identifiers used to calculate the liquidity index score 308.

Figure 4:
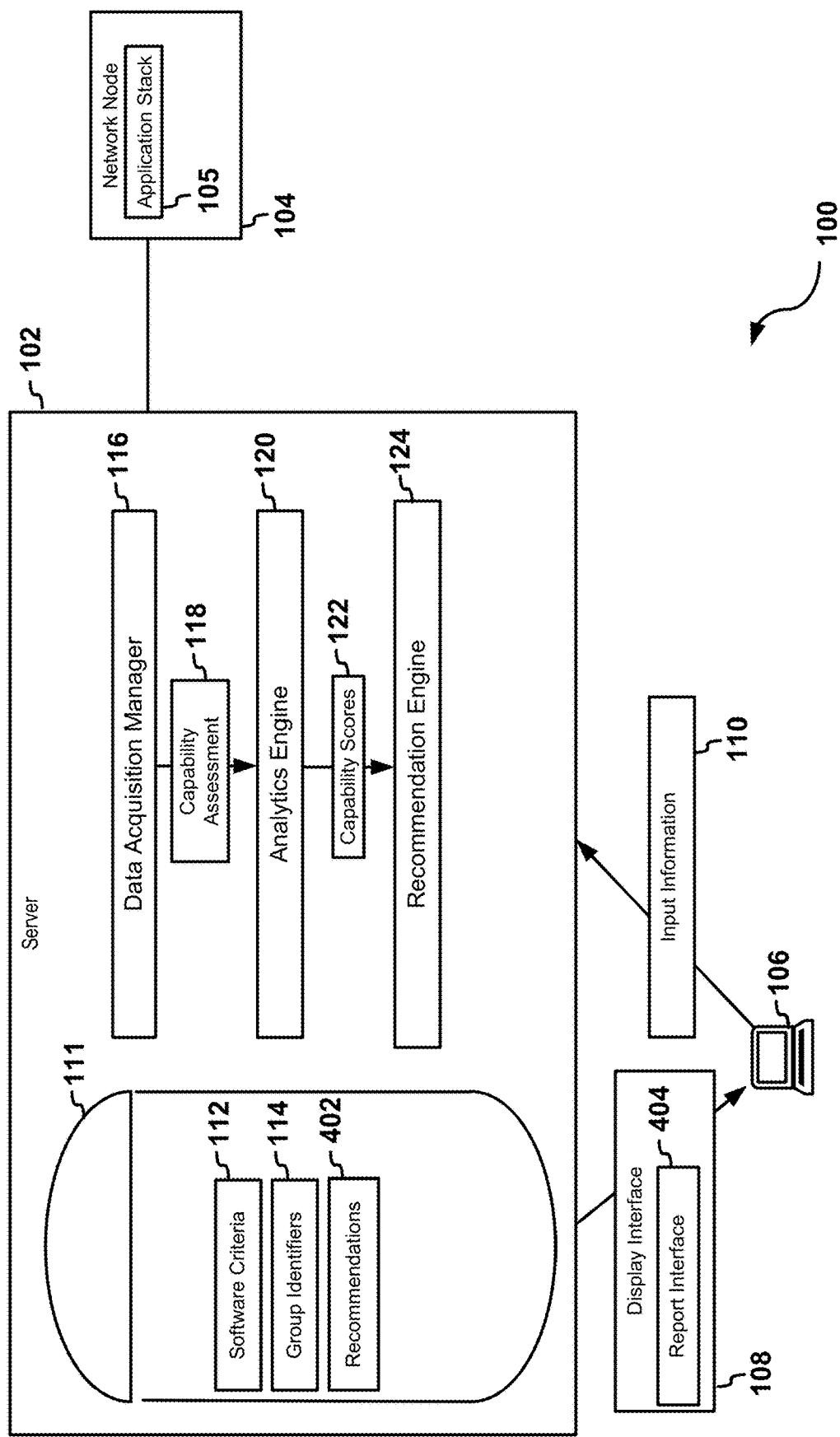
FIG. 4 illustrates an example of a recommendation engine for a system.

FIG. 4 illustrates an example of the recommendation engine 124 for the system 100. The recommendation engine 124 may access recommendations 402. For example, the repository 111 may include the recommendations 402. The recommendations 402 may include predetermined text descriptive of an improvement to the software capabilities of the network node 104. The recommendation text may include actions, suggestions, or requirements for modifications to the software included in the network node 104. For example, the recommendation text may include a suggested modification to the network node including hybrid cloud architecture transformation and virtualization management deployment.

The recommendations 402 may include or be associated with identifiers such as primary keys and/or foreign keys used to established mappings in the repository 111. For example, the recommendations 402 may be associated with one or more of the software criteria 112 and/or the group identifiers. The recommendations 402 may include a suggested improvement to satisfy one or more of the software criteria 112. Alternatively or in addition, the recommendations 402 may include text, images or other displayable information. In some examples, the recommendations 402 may include instructions, logic or other command used to generate the display interface 108 or a portion thereof.

The recommendation engine 124 may generate the report interface 404. The report interface 404 may include one or more recommendations 402. The recommendation engine 124 may select the recommendations 402 to include in report interface 404. Alternatively or in addition, the recommendation interface may include the capability assessment 118 and/or the capability scores 122.

The recommendations 402 may be selected for the report interface 404 based on the capability scores 122. For example, the capability scores 122 may be associated with the software criteria 112 and/or the group identifiers 114. The recommendations 402 may be selected in response to a comparison of the capability scores 122 with a predetermined threshold value. The predetermined threshold value may also be associated with the software criteria 112. Accordingly, when the capability scores are lower than the predetermined threshold, the recommendation engine 124 may select a recommendation. In other examples, the repository 111 may store evaluation logic (not shown in FIG. 4) that determines whether to display the recommendations 402 based on the capability scores 122. The evaluation logic may include predefined comparisons, rules, logic, and/or criteria used to determine whether to display the recommendations 402 and/or include one or more recommendations 402 in the report interface 404. The evaluation logic may be associated with one or more software criteria 112 and may evaluate scores associated with the one or more software criteria 112.

In some examples, the recommendations 402 may be sorted based on the capability assessment 118 and/or the capability scores 122. For example, the capability assessment 118 may include capability metrics 210 and/or capability weights 212 (FIG. 2.). The recommendations 402 may be ranked on the display interface 108 according to the capability metrics 210 and/or the capability weights 212, for example from high to low or low to high. Since the capability weights 212 may, in some examples, indicate the importance of the associated software criteria 112 to a user, the recommendations 402 associated with the same software criteria may be ranked according to the importance to the user. Alternatively or in addition, the recommendations 402 may be ranked according got the criteria score 304, group score 306 and/or liquidity index score 308. (FIG. 3). Alternative or in addition, the recommendations 402 may also be grouped in the report interface 404. For example, the recommendations 402 may be grouped according to the group identifiers.

When data acquisition manager 116, the analytics engine 120 and/or the recommendation engine 124 are processing information as described herein, there may be a delay between the time a user requests the display interface 108 and the time the user receives the display interface 108. In some examples, the recommendation engine 124 may generate a notification message. The recommendation engine 124 may send the notification message to the terminal device 106 or some other electronic device, in response to completion of processing by the data acquisition manager 116, the analytics engine 120 and/or the recommendation engine 124. The notification message may include the display interface 108. Alternatively or in addition, the notification message may include a link configured to load the display interface 108. The link may request the display interface 108 from the server 102.

Figure 5:
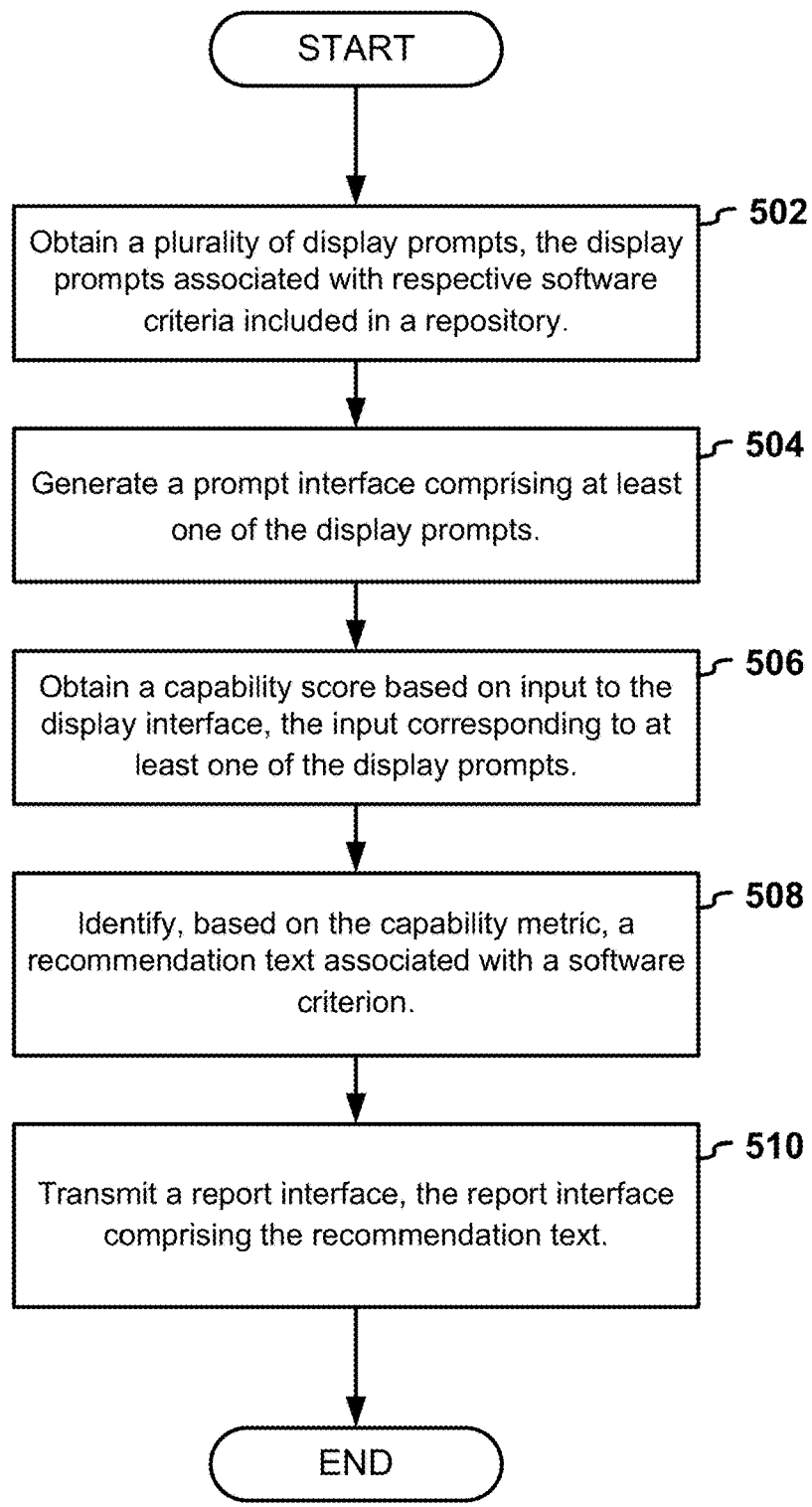
FIG. 5 illustrates an example of a logic flow diagram for a system.

FIG. 5 illustrates an example of a logic flow diagram for the system 100. The server 102 may obtain a plurality of display prompts 202, the display prompts 202 may be associated with respective software criteria (502). The respective software criteria may be indicative of software capabilities for a software architecture. The software architecture may include a target software architecture comprising targeted design principles for the network node 104. The respective software criteria may include criteria that satisfies the targeted design principles. The software criteria 112 and/or the display prompts 202 may be stored in the repository 111. In some examples, the display prompts 202 may associated with respective software criteria stored in the repository 11, the respective software criteria indicative of a plurality of rules for assessing an implementation of a software architecture on the network node 114, the respective software criteria may include a first group of software criteria representative of software modularity, a second group of software criteria representative of software interoperability, a third group of software criteria representative of software scalability, and/or a fourth group of criteria representative of software maintainability.

The server 102 may generate the prompt interface 206 comprising at least one of the display prompts 202 (504). The prompt interface 206 may include one or more of the display prompts 202. In some examples, the server 102 may transmit the prompt interface 206. For example, the server 102 may transmit the prompt interface 206 to the terminal device 106.

In some examples, it may be desirable to filter the number of display prompts communicated to the terminal device 106. The server 102 send a probe message to the network node 104. The probe message may utilize a software protocol implemented on the network node 104. The server 102 may receive, from the network node 104, a response message. The response message may include, for example, the probe results 218. The server 102 may evaluate the response message to determine the presence of the software capability on the network node 104. The software capability may correspond to a feature included on the network node 104 that satisfies one or more of the software criteria 112. The feature may identified by exercising the network functions exposed by the network node 104. The server 102 may include, in response to determination of the presence of the software feature, the at least one of the display prompts 202 in the display interface 108.

In some examples, the server 102 may control the order, timing, and/or amount of the display prompts 202 that are displayed. For example, the server 102 may group display prompts by similar types of software criteria 112 and/or group identifiers 114. Alternatively or in addition, the display interface may include a button that allows the user to cycle through display prompts 202.

The server 102 may obtain a capability score based on input to the display interface 108, the input corresponding to at least one of the display prompts 202 (506). The capability score may be representative of a measurement of satisfaction of a software criterion by the network node 104. For example, the capability score may include the criteria score 304, the group score 306, and/or the liquidity index score 308.

In some examples, the server 102 may receive, form the terminal device 106, one or more capability metrics 210 and/or one or more capability weights 212. The server 102 may generate the capability score based on the capability weight value and the capability metric value. Alternatively or in addition, the server 102 may identify, in the repository 111, the scoring logic 302. The scoring logic 302 may be configured to generate the capability metric. For example, the scoring logic 302 may generate the capability metric based on the capability assessment 118 and/or input corresponding to at least one of the display prompts 202. The server 102 may calculate, based on the scoring logic 302 and the input corresponding to at least one of the display prompts 202, the capability metric.

The server 102 identify, based on the capability metric, a recommendation text associated with a software criterion (508). The software criterion may be included in the software criteria 112 stored in the repository 111. The recommendation may be included in one or more of the recommendations 402 stored in the repository 111. The recommendation text may include predetermined text comprising a suggested modification to the network node 104. The recommendation text may include a suggested modification to the network node including hybrid cloud architecture transformation and virtualization management deployment.

Alternatively or in addition, the server 102 may identify, based on the capability score, a plurality of recommendations associated with the software criteria. The plurality of recommendations may include a first recommendation to improve software modularity on the network node, a second recommendation to improve software interoperability on the network node, a third recommendation to improve software scalability on the network node, and a fourth recommendation to improve software maintainability on the network node.

The server 102 may generate the report interface 404, the report interface comprising the recommendation text (510). The report interface 404 may be displayable by the terminal device 106. The report interface 404 may include on or more of the recommendations 402. The recommendations 402 may be organized on the display interface 108. In some examples, the recommendations 402 may be arranged on the report interface 404 according to the capability scores 122. For example, the recommendations 402 may be mapped to software criteria 112 in the repository 111. In addition, the software criteria 112 may be mapped to the capability scores 122, the capability metrics 210, and/or the capability weights 212. The recommendations 402 may be sorted on the display interface 108 according to the capability scores 122, the capability metrics 210, and/or the capability weights 212. In some examples, the server 102 may transmit the report interface 404. For example, the server 102 may transmit the report interface 404 to the terminal device 106.

In some examples, the recommendations 402 may be identified based on the capability scores 122. For example, the server 102 may compare the capability score to a predetermined threshold value. The server 102 may display recommendation text in response to comparison of the capability metric with the predetermined threshold value. For example, the server 102 may include the recommendation text on the report interface 404 in response to one or more of the capability scores 122 being greater than or less than the predetermine threshold.

FIG. 6 illustrates an example of the display interface for the system 100. The display interface 108 may be configured to display the group identifiers 114. Alternatively or in addition, the display interface may be configured to display the group score 306 for one or more group identifiers 114. In addition, the display interface 108 may include the liquidity index score 308.

The display interface also may be configured to display the group weights 602. The group weights 602 were previously discussed in reference to FIG. 3. The analytics engine may calculate weighted group scores 604 based a weighted combination of the group score and the groups weights. One or more of the weighed group scores may correspond to one or more of the group identifiers 114.

FIG. 7 illustrates an example of prompt interfaces 702A-C for the system 100. The display prompt interfaces 702A-C may be examples of the prompt interface 206 described in reference to FIG. 2.

The display prompt interfaces 702A-C may each be arranged on the same or separate display interface. For example, the prompt interfaces may be arranged in a succession of pages that prompt the user for input. In some examples, the order in which the prompt interfaces are displayed may be determined based on the group identifier. Accordingly, the prompt interfaces may be included request information in stages that focus on certain design principles or software capabilities. Alternatively or in addition, the multiple prompt interfaces may displayed on the same page. A page may refer to the webpage, a GUI frame, or any other area of display.

The display prompt interfaces 702A-C may include one or more of the display prompts 202. In some examples, each display prompt interface may correspond to a software criterion. The display prompts 202 of the display prompt interfaces 702A-C may be tailored to minimize the amount human error in assessing the capabilities of the network node 104.

In some examples, the software criteria may correspond to capabilities, which are easily discernable. The first display prompt interface 702A provides an example of a display prompt that asks a question for discrete input. As illustrated in FIG. 1, the discrete input may include a Yes/No answer. When the user selects yes/or no the results may be included in the input information 110 and communicated to the server. The server may analyze the results and generate the capability assessment, as previously described herein.

Alternatively or in addition, the software criteria 112 may correspond to capabilities that may be assessed on a sliding scale or in a spectrum. The second display prompt 702B is an example of a prompt interface that provides a scale for user input. When the user selects a rating on the scale, the results may be included in the input information 110 and communicated to the server. The bounds of the scale may or may not correspond to scales included in the scoring logic. In some examples, the server 102 may translate a scale displayed to a user to a scale understood by the scoring logic 302 and/or the analytics engine 120.

In some examples, the display prompts may request information from a user that is used by the server 102 to communicate with the network node 104 to assess the capabilities provided by the network node 104. For example, the third display prompt interface 702C may include an input field. In the example in FIG. 7, the input field requests an HTTP address. The HTTP address input by the user may be used by the data acquisition manager to probe the network node 104. For example, the HTTP address may be used to test the REST capabilities of the network node 104. In other examples, the input field may request any information that may be used to communicate with the network node 104.

Figure 8:
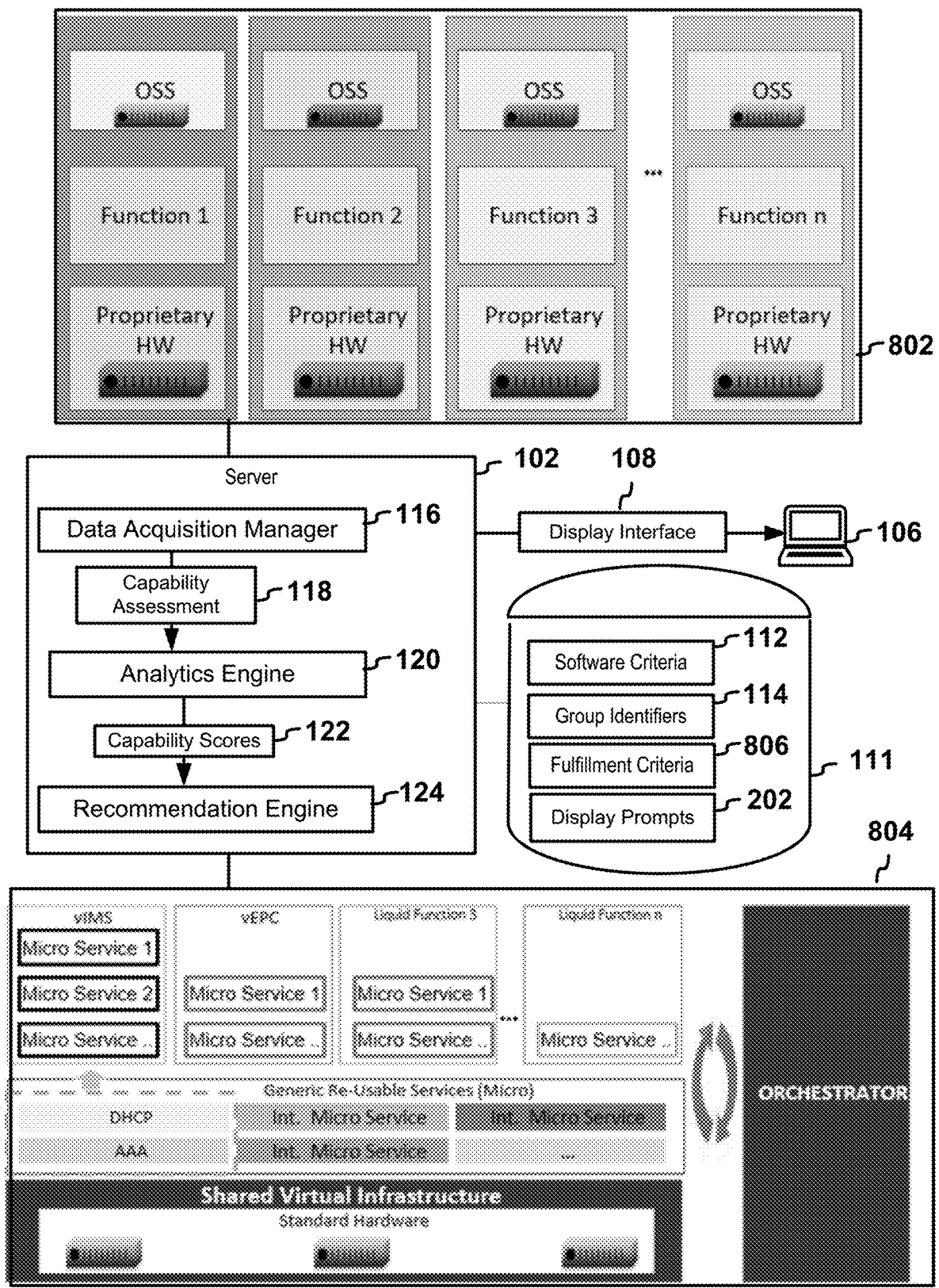
FIG. 8 illustrates an example of a legacy network node and an improved network node.

FIG. 8 illustrates an example of a legacy network node 802 and a liquid network node 804. The legacy network node 802 may include an example of the network node 104. The server 102 may facilitate transitioning, migrating, and/or upgrading the legacy network node to the liquid network node 804. The legacy network node 802 may include software and/or network functions that do not adhere to a targeted software architecture. For example, the legacy network 802 node may include fragmented software tightly coupled with specific/purpose-built hardware.

The liquid network node 804 may include an example of the network node 104 that includes reusable micro services and generic building blocks. The liquid network node may include cloud enabled network functions. The liquid network node 804 may include automated DevOps enabled service lifecycle management. Alternatively or in addition, the liquid network node 804 may include elastic infrastructure & services that provide auto remediation and self-healing. The liquid network node 804 may follow an open architecture that does not restrict the software to hardware from specific vendors or manufacturers.

In some examples, the server 102 may communicate with both the legacy network node 802 and the liquid network node 804 to migrate the legacy network node 802 to the liquid network node. It should be appreciated that in some examples, the legacy network node 802 and the liquid network node 804 may include two separate nodes. Alternatively, the legacy network node 802 and the liquid network node 804 may correspond to the same network node at different stages of development and/or migration.

The server 102 may be used at various stages of migrating the legacy network node 802 to the liquid network node 804. For example, the migration may include three stages. In the first stage, software capabilities, such as virtual network functions (VNFs), may be abstracted and improved to operate with specific cloud design principles. The software capabilities may be improved to operate in the cloud with a static number of server roles instances. Alternatively or in addition, the software capabilities may be improved to allow basic Operate & Maintenance (O&M) infrastructure operation (backup, v-motion). Infrastructure resource utilization like file system/IP services may be reduced in the first stage. Alternatively or in addition, the software capabilities will be compliant to security requirements In a second stage of the migration, the legacy network node 802 may be improved to support automatic life cycle management. Alternatively or in addition, the legacy network node may be improved to support integration with DevOps to automatize release management, functional test, and performance test.

In the third stage of migration, the legacy network node 802 may improved to deploy micro-container, for example DOCKER, and transform application architecture to a full micro-service architecture. The micro-service capabilities may be exposed as an API.

The previously described stages of development are non-limiting examples. In some circumstances, there may be additional or fewer stages and the criteria for satisfying each stage may vary.

The server 102 may map the software criteria 112 stored in the repository to various stages of migration. In some examples, the display prompts 202 presented to the user may be filtered based on the stages of migration. For example, the legacy network node 802 may be assessed in a first stage of migration. The display prompts 202 according to the second and third stage of migration may be filtered from the display interface 108. Accordingly, the user may not be prompted with display prompts 202 corresponding to the software criteria 112 that are not applicable at a current stage of migration.

The server 102 may compare one or more of the capability scores 122 with fulfillment criteria 806 to determine whether one or more software criteria 112 is fulfilled. The fulfillment criteria 806 may include rules, logic, threshold values and other information that may be used to analyze the capability scores 122. In some examples, the capability scores 122 may be stored in the repository 111 from previous iterations and/or migration stages. The server 102 may filter prompt interfaces from the display interface 108 in response to the software criteria being fulfilled. For example, a previously determined capability score may be mapped to a software criterion. Based on an analysis of the previously determined capability score with the fulfillment criteria, the server 102 may determine that the software criterion is fulfilled. The server may not include the display prompt associated with the software criterion in the display interface 108

Figure 9:
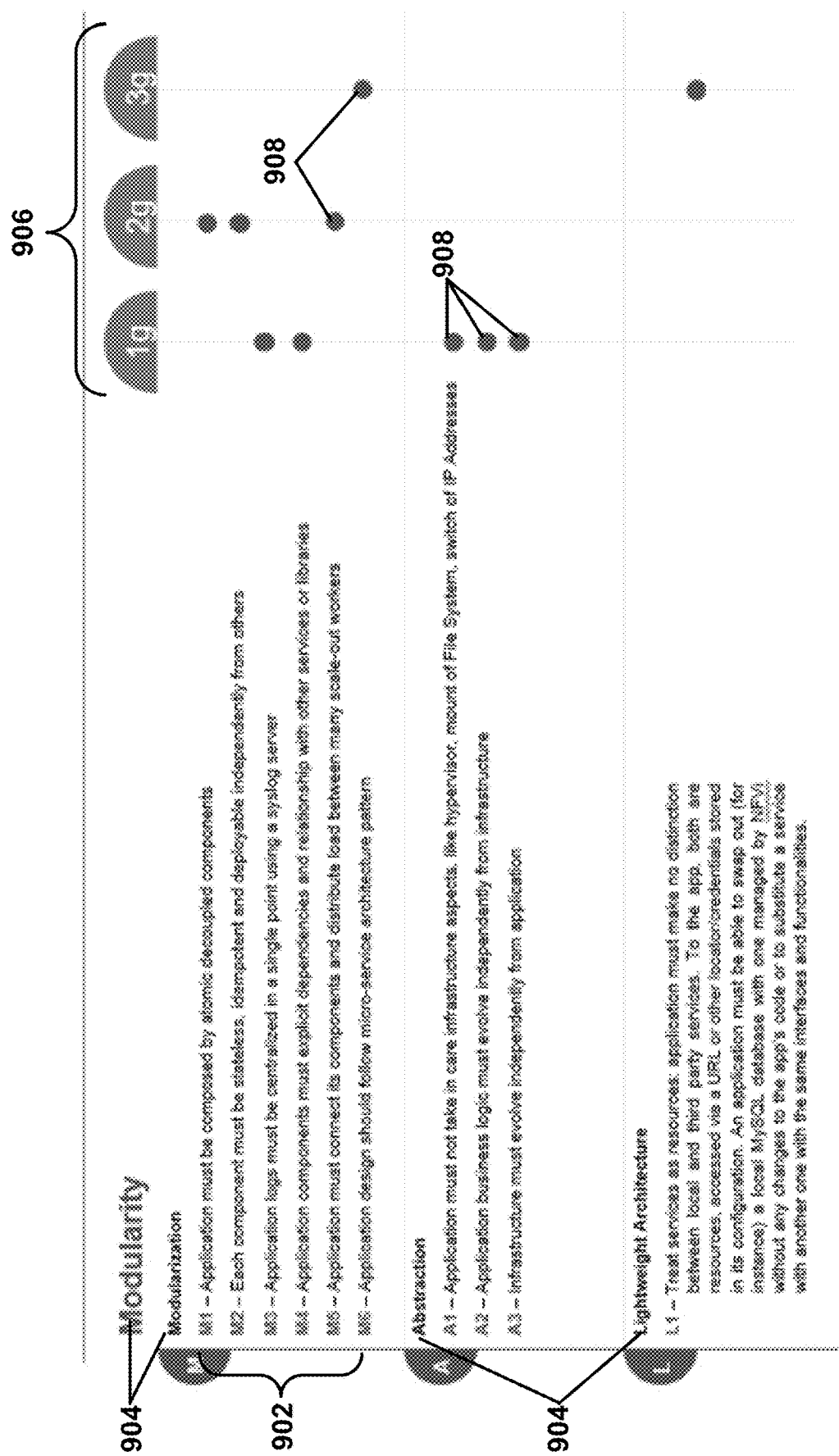
FIG. 9 Illustrates a second example of a display interface for a system

FIG. 9 Illustrates a second example of the display interface 108 for the system 100. The display interface 108 may include the software criteria labels 902 that corresponds to the software criteria 112. The software criteria labels 902 may be sorted by the group identifiers 114. The display interface 108 may include group identifier labels 904 that corresponds to the group identifiers 114. The software criteria labels 902 and/or the group identifier labels 904 may be included in the repository described in reference to FIG. 1.

The display interface 108 may further include stage identifier labels 906. The stage identifier labels 906 may correspond to the migration stages described in reference to FIG. 8. The repository 111 may include stage identifiers that are mapped to the software criteria 112 and/or the capability scores 122 determined for the software criteria 112. The display interface 108 may further include fulfillment indicators 908 that indicate whether the software criteria 112 corresponding to the software criteria labels 902 has been satisfied. For example, the fulfillment indicators 908 may be included by the server 102 based on a comparison of the capability scores 122 with satisfaction threshold values associated with the software criteria 112. Alternatively or in addition, the fulfillment indicators 908 may be included or excluded by the server 102 based on a comparison of the capability scores 122 with the fulfillment criteria 806 (FIG. 8). For example, one or more of the fulfillment indicators 908 may be included in the display interface 108 in response to correspond capability score being greater than the satisfaction threshold value. The satisfaction threshold values may be included in the repository and/or associated with the software criteria 112.

The system 100 may be implemented with additional, different, or fewer components than illustrated. The logic illustrated in the flow diagrams may include additional, different, or fewer operations than illustrated. The operations illustrated may be performed in an order different than illustrated.

Figure 10:
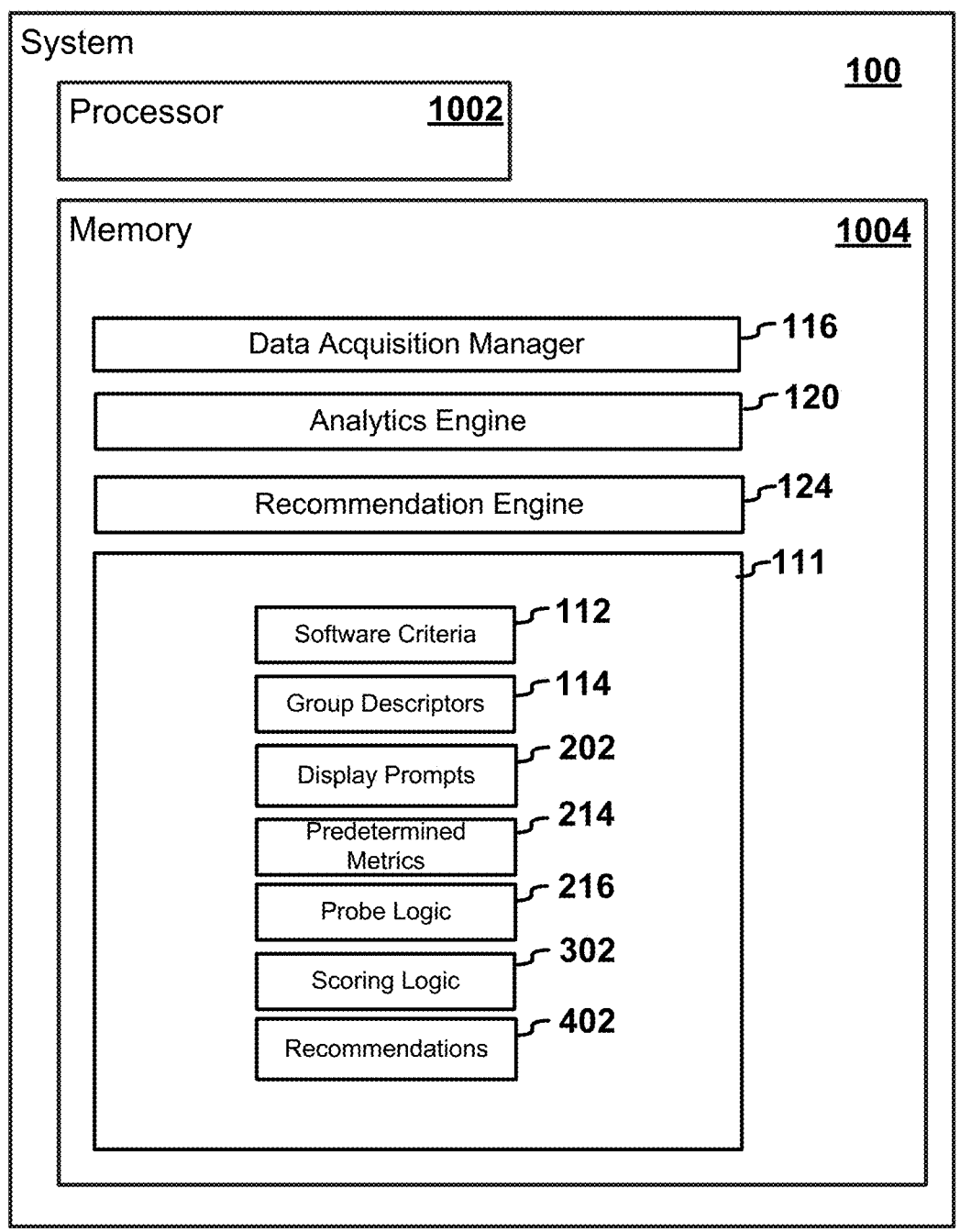
FIG. 10 illustrates an example of the system that includes a processor and a memory.

FIG. 10 illustrates an example of the system 100 that includes a processor 1002 and a memory 1004. The processor 1002 may be in communication with the memory 1004. In one example, the processor 1002 may also be in communication with additional elements, such as a network interface (not shown). Examples of the processor 1002 may include a general processor, a central processing unit, a microcontroller, a server, an application specific integrated circuit (ASIC), a digital signal processor, a field programmable gate array (FPGA), and/or a digital circuit, analog circuit, or some combination thereof.

The processor 1002 may be one or more devices operable to execute logic. The logic may include computer executable instructions or computer code stored in the processor 1002 or in other memory that when executed by the processor 1002, cause the processor 1002 to perform the features implemented by the logic of the data acquisition manager 116, the analytics engine 120, the recommendation engine 124, the repository 111, the software criteria 112, the group identifiers 114, the display prompts 202, the probe logic 216 and/or the scoring logic 302, the fulfillment criteria 806 and/or the system 100. The computer code may include instructions executable with the processor 1002.

The processor 1002 may be any device for storing and retrieving data or any combination thereof. The processor 1002 may include non-volatile and/or volatile memory, such as a random access memory (RAM), a read-only memory (ROM), an erasable programmable read-only memory (EPROM), or flash memory. Alternatively or in addition, the processor 1002 may include an optical, magnetic (hard-drive) or any other form of data storage device.

The processor 1002 may include at least one the server 102, the data acquisition manager 116, the analytics engine 120, and/or the recommendation engine 124. In addition, the memory 1004 may include any other component previously discussed, such as the server 102, data acquisition manager 116, the analytics engine 120, the recommendation engine 124, the repository 111, the software criteria 112, the group identifiers 114, the display prompts 202, the probe logic 216, the scoring logic 302, the recommendations 402, the predetermined metrics 214, the fulfillment criteria 806, and/or other components of the system 100 described herein.

The system 100 may be implemented in many different ways. For example, each component of the system may include a circuit or circuitry. Each circuit or circuitry may be hardware or a combination of hardware and software. The circuitry may include the server 102, data acquisition manager 116, the analytics engine 120, the recommendation engine 124, the repository 111, the software criteria 112, the group identifiers 114, the display prompts 202, the probe logic 216, the scoring logic 302, the recommendations 402, the predetermined metrics 214, the fulfillment criteria 806, and/or other components and subcomponents of the system 100 described herein. For example, each circuit or circuitry may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each circuitry may include memory hardware, such as a portion of the processor 1002, for example, that comprises instructions executable with the processor 1002 or other processor to implement one or more of the features of the circuitry. When any one of the circuitry includes the portion of the memory that comprises instructions executable with the processor 1002, the circuitry may or may not include the processor 1002. In some examples, each circuitry may just be the portion of the processor 1002 or other physical memory that comprises instructions executable with the processor 1002 or other processor to implement the features of the corresponding circuitry without the circuitry including any other hardware. Because each circuitry includes at least some hardware even when the included hardware comprises software, each circuitry may be interchangeably referred to as a hardware circuitry.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

All of the discussion, regardless of the particular implementation described, is illustrative in nature, rather than limiting. For example, although selected aspects, features, or components of the implementations are depicted as being stored in memory(s), all or part of the system 100 or systems may be stored on, distributed across, or read from other computer readable storage media, for example, secondary storage devices such as hard disks, flash memory drives, floppy disks, and CD-ROMs. Moreover, the various modules, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer, central processing unit ("CPU"), graphics processing unit ("GPU"), or system.

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system for enabling deployment of hybrid cloud technology and virtualization application stack analytics, the system comprising:
  a processor, the processor configured to:
  obtain a plurality of display prompts, the display prompts associated with a stack of respective software criteria stored in a repository, the stack of respective software criteria indicative of a software architecture for an application stack included in a network node, the stack of respective software criteria including a first group of software criteria representative of software modularity, a second group of software criteria representative of software interoperability, a third group of software criteria representative of software scalability, and a fourth group of criteria representative of software maintainability;
  transmit a prompt interface comprising at least one of the display prompts;
  obtain, from an analytics engine, a capability score based on receipt of an input to the prompt interface, the input to the prompt interface corresponding to the at least one of the display prompts, the capability score representative of a measurement of satisfaction of at least one of the software criteria by the network node;

identify, based on the capability score, a plurality of recommendations associated with the respective software criteria, the recommendations comprising a first recommendation descriptive of a first recommendation to improve software modularity on the network node, a second recommendation to improve software interoperability on the network node, a third recommendation to improve software scalability on the network node, and a fourth recommendation to improve software maintainability on the network node; and transmit a report interface comprising the recommendations.

2. The system of claim 1, wherein at least one of the display prompts correspond to the first group of software criteria representative of software modularity, the at least one of the display prompts configured to request an assessment of the network node including at least one of:
atomic decoupled components,
stateless components that operate independent of other components, or
micro-services.

3. The system of claim 1, wherein at least one of the display prompts correspond to the second group of software criteria representative of software interoperability, the at least one of the display prompts configured to request an assessment of the network node including at least one of:
software having an application program interface (API) layer,
software having a representational state transfer (REST) web services, or
software having network function virtualization (NFV).

4. The system of claim 1 wherein to obtain the capability score, the processor is further configured to:
receive, from a terminal device configured to display the prompt interface, a capability weight value and a capability measurement value corresponding to at least one of the respective software criteria;
generate the capability score based on the capability weight value and the capability measurement value; and
associate the capability score with the at least one of the respective software criteria.

5. The system of claim 1, wherein the processor is further configured to:
send a probe message to the network node using a software protocol implemented on the network node;
receive, from the network node, a response message;
evaluate the response message to determine a presence of a software capability on the network node; and
include, in response to determination of the presence of the software capability, the at least one of the display prompts in the prompt interface.

6. The system of claim 1, wherein to identify the plurality of recommendations, the processor is further configured to:
compare the capability score to a predetermined threshold value; and
select a recommendation associated with the at least one of the software criteria in response to comparison of the capability score with the predetermined threshold value.

7. The system of claim 1, where in the processor is further configured to:
communicate the prompt interface to a terminal device;
receive, from the terminal device, the input including capability assessment information; and
access scoring logic associated with the at least one of the software criteria, the scoring logic configured to calculate the capability score,
wherein to obtain the capability score, the processor is further configured to calculate the capability score based on the scoring logic and the capability assessment information.

8. A computer-implemented method, comprising:
obtaining a plurality of display prompts, the display prompts associated with a stack of software criteria stored in a repository, the software criteria indicative of a software architecture for an application stack included in a network node, the display prompts sorted based on criteria groups, the criteria groups comprising a first criteria group based on software modularity, a second criteria group based on software interoperability, a third criteria group based on software scalability, and a fourth criteria group based on software maintainability;
transmit a prompt interface comprising at least one of the display prompts;
obtaining, from an analytics engine, a capability score based on receipt of an input to the prompt interface, the input corresponding to the at least one of the display prompts, the capability score representative of a measurement of satisfaction of a software criterion by the application stack of the network node;
identifying, based on the capability score, a plurality of recommendations associated with the software criteria, the recommendations including a first recommendation descriptive of a first recommendation to improve software modularity on the network node, a second recommendation to improve software interoperability on the network node, a third recommendation to improve software scalability on the network node, and a fourth recommendation to improve software maintainability on the network node; and
transmit a report interface comprising the plurality of recommendation.

9. The computer-implemented method of claim 8, wherein at least one of the display prompts are associated with the third criteria group based on software scalability, the at least one of the display prompts configured to request an assessment of the network node including at least one of:
services that are fault-tolerant;
services that expose health metrics; or
services that communicate over a secure protocol.

10. The computer-implemented method of claim 8, wherein at least one of the display prompts are associated with the fourth criteria group corresponding to software maintainability, the at least one of the display prompts configured to request an assessment of the network node including at least one of:
software developed based on agile development;
software managed by development operation platforms; or
software compiled and tested using executable scripts.

11. The computer-implemented method of claim 8, wherein the step of transmitting the report interface further comprises:
sorting the recommendations based on a plurality of respective capability scores, the respective capability scores associated with the recommendations in the repository; and including the sorted recommendations in the report interface.

12. The computer-implemented method of claim 11, wherein the step of obtaining the capability score, further comprises:
receiving, from the prompt interface, a plurality of responses to the display prompts;
generating, based on predetermined scoring logic and the responses, respective capability scores for the software criteria;
generating, based the respective capability scores, respective group scores for the criteria groups;
weighing the respective group scores with predetermined weights associated with the criteria groups; and
generating an index score based on a weighted combination of the respective group scores.

13. The computer-implemented method of claim 8, wherein the step of identifying the plurality of recommendations, further comprises:
comparing the capability score to a predetermined threshold value; and
selecting a recommendation associated with the software criterion in response to comparison of the capability score with the predetermined threshold value.

14. The computer-implemented method of claim 8, further comprising:
generating a notification message comprising a link configured to load the report interface;
determining generation of the report interface is completed; and
communicating, in response to generation of the report interface being completed, the notification message to a terminal device.

15. A computer readable storage medium comprising computer executable instructions, the computer executable instructions executable by a processor, the computer executable instructions comprising:
instructions executable to a plurality of display prompts, the display prompts associated with software criteria stored in a repository, the respective software criteria a plurality of rules corresponding to a software architecture for an application stack included in a network node, the software criteria including a first group of software criteria representative of software modularity, a second group of software criteria representative of software interoperability, a third group of software criteria representative of software scalability, and a fourth group of criteria representative of software maintainability;
instructions executable to transmit a prompt interface comprising at least one of the display prompts;
instructions executable to obtain, from an analytics engine, a capability score based on receipt of an input to the prompt interface, the input corresponding to the at least one of the display prompts, the capability score representative of a measurement of satisfaction of at least one of the software criteria by the network node;
instructions executable to identify, based on the capability score, a plurality of recommendations associated with the software criteria, the plurality of recommendations comprising a first recommendation to improve software modularity on the network node, a second recommendation to improve software interoperability on the network node, a third recommendation to improve software scalability on the network node, and a fourth recommendation to improve software maintainability on the network node; and
instructions executable to transmit a report interface, the report interface comprising the plurality of recommendations.

16. The computer readable storage medium of claim 15, wherein the instructions executable by the processor to obtain the capability score further comprise:
instructions executable by the processor to receive, from a terminal device configured to display the prompt interface, a capability weight value;
instructions executable by the processor to receive, from the terminal device, a capability metric value; and
instructions executable by the processor to generate the capability score based on the capability weight value and the capability metric value.

17. The computer readable storage medium of claim 15, further comprising
instructions executable by the processor to determine, based on fulfillment logic and the capability score, whether one or more of the software criteria is satisfied; and
instructions executable by the processor to include, on the report interface, a display indicator corresponding to one or more software criteria, the display indicator indicative of satisfaction of the one or more software criteria.

18. The computer readable storage medium of claim 15, wherein the instructions executable by the processor to identify the recommendations further comprise:
instructions executable by the processor to compare the capability score to a predetermined threshold value; and
instructions executable by the processor to select a recommendation associated with the at least one of the software criteria in response to comparison of the capability score with the predetermined threshold value.

19. The computer readable storage medium of claim 15, wherein the instructions executable by the processor to generate the report interface further comprise:
instructions executable by the processor to sort the recommendations based on a plurality of respective capability scores, the respective capability scores associated with the recommendations in the repository; and
instructions executable by the processor include the sorted recommendations in the report interface.

20. The computer readable storage medium of claim 15, wherein the instructions executable by the processor to generate the report interface further comprise:
instructions executable by the processor to communicate a probe message to the network node according to a communication protocol configured on the network node;
instructions executable by the processor to receive a response from the network node;
instructions executable by the processor to determine, based on the response, that the network node satisfies the at least one of the software criteria; and
instructions executable by the processor to filter, from the display prompts, one or more display prompts associated with the at least one of the software criteria.

21. A system for enabling deployment of hybrid cloud technology and virtualization application stack analytics, the system comprising:
a processor, the processor configured to:
obtain a plurality of display prompts, the display prompts associated with a stack of respective software criteria stored in a repository, the stack of respective software criteria indicative of a software architecture for an application stack included in a network node, the stack of respective software criteria including a first group of software criteria representative of software modularity, a second group of software criteria representative of software interoperability, wherein at least one of the display prompts correspond to the second group of software criteria and is configured to request an assessment of the network node including at least one of: software having an application program interface (API) layer, software having a representational state transfer (REST) web services, or software having network function virtualization (NFV), a third group of software criteria representative of software scalability, and a fourth group of criteria representative of software maintainability;

transmit a prompt interface comprising at least one of the display prompts;

obtain, from an analytics engine, a capability score based on receipt of an input to the prompt interface, the input to the prompt interface corresponding to the at least one of the display prompts, the capability score representative of a measurement of satisfaction of at least one of the software criteria by the network node;

identify, based on the capability score, a plurality of recommendations associated with the respective software criteria, the recommendations comprising a first recommendation descriptive of improvement of software modularity on the network node, a second recommendation to improve software interoperability on the network node, a third recommendation to improve software scalability on the network node, and a fourth recommendation to improve software maintainability on the network node; and transmit a report interface comprising the recommendations.

22. The system of claim 21, wherein at least one of the display prompts correspond to the first group of software criteria representative of software modularity, the at least one of the display prompts configured to request an assessment of the network node including at least one of:

atomic decoupled components, stateless components that operate independent of other components, or micro-services.

23. The system of claim 22, wherein at least one of the display prompts are associated with the third criteria group based on software scalability, the at least one of the display prompts configured to request an assessment of the network node including at least one of:

services that are fault-tolerant;

services that expose health metrics; or services that communicate over a secure protocol.

24. The system of claim 23, wherein at least one of the display prompts are associated with the fourth criteria group corresponding to software maintainability, the at least one of the display prompts configured to request an assessment of the network node including at least one of:

software developed based on agile development;

software managed by development operation platforms; or software compiled and tested using executable scripts.

\* \* \* \* \*